Nov. 3, 1959     C. H. GUTH ET AL     2,911,551
SPACER FOR COMMUTATOR RISERS
Filed June 20, 1958

Inventors
Charles H. Guth
Clarence W. Wilson
by *Their Attorney*

United States Patent Office 2,911,551
Patented Nov. 3, 1959

2,911,551

SPACER FOR COMMUTATOR RISERS

Charles H. Guth and Clarence W. Wilson, Erie, Pa., assignors to General Electric Company, a corporation of New York Application June 20, 1958, Serial No. 743,408

3 Claims. (Cl. 310—234)

Our invention relates to dynamoelectric machines provided with commutators and particularly to spacers for the risers connecting the commutator segments to the rotor windings.

In some of its broader aspects, our invention is an improvement over the Letters Patent 2,829,289, issued to Barry Ottewell on April 1, 1958.

In dynamoelectric machine rotors provided with commutators, risers normally secured to the commutator segments are soldered or brazed to the leads of the armature coils. When the length of the risers is great compared to their cross-sectional area, their natural frequency of vibration is likely to be low enough to be excited by normal operating conditions of a dynamoelectric machine. In order to eliminate these low frequency vibrations, it has been found necessary to provide some type of supporting and spacing structure. This will prevent deflection likely to cause imbalance and prevent vibration which would damage any insulation and might cause breakage of the riser at any mechanical stress concentration point.

One known practice has been to provide the risers intermediate their length with lashings of resin impregnated twine or glass cord forming annular supports at one or more places. The cord support has at least three decided disadvantages. First, it is necessary to provide temporary rigid spacers during the binding which must be removed before the twine is impregnated and cured. The absence of these spacers will allow unrestricted movement of the risers during the binding process sometimes resulting in the non-uniform spacing of the risers, thereby permitting contact between the risers during use. Second, it is expensive to apply in terms of both material and labor. Third, the cord, being in tension, only provides rigidity because of the insulation resin applied to the risers and cured to be solid. From time to time, the cured resin cord binding may fail because it cannot withstand the riser vibrations encountered.

Another practice has been to apply to the risers spacing buttons which cooperate when assembled to provide an annular support. However, the use of buttons usually requires providing of a stress concentrating recess or aperture at the most critical stress point in the length of the riser.

If damaged, both of these arrangements are very difficult and expensive to repair. Moreover, both of these methods have economic disadvantages in manufacture and maintenance as well as functional short-comings.

The object of our invention is to provide a simple and inexpensive commutator open riser support spacer arrangement which may be quickly and economically assembled on the risers of a completed commutator.

In accordance with one aspect of our invention, we provide a plurality of flat elongated insulating spacers each defining apertures through which a plurality of risers of a rotor having a segmented commutator may be threaded. The spacers are assembled as an annular support ring by compressing slightly a plurality of the ends of the risers sufficiently to allow threading of the risers through the apertures defined in one spacer and moving the spacer radially toward the axis of the commutator sufficiently to allow the risers to return to their natural location thereby preventing relative vibration between these risers. By the use of a plurality of spacers positioned equidistant for the commutator assembly, an annular support is formed. The spacers thus positioned are under pressure to provide arch binding and also may be secured by additional holding means such as a binding cord passing through a separate aperture to prevent radial displacement. In some applications, it may be desirable to impregnate the binding cord with a thermosetting plastic which will solidify to eliminate substantially any movement of the spacers.

The subject matter which we regard as our invention is particularly pointed out and distinctly claimed in the concluding portion of this specification. Our invention, however, as to its organization and its method of operation together with further objects and advantages thereof will best be understood by reference to the following description taken in connection with the accompanying drawing, in which:

Figure 1:
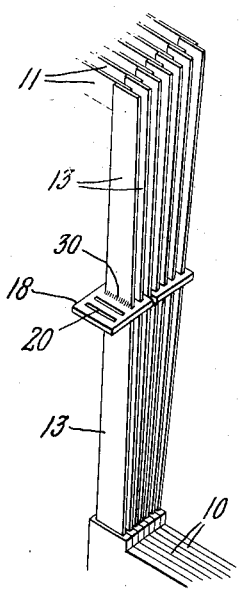
Fig. 1 is a perspective view of a portion of a commutator constructed according to our invention.

Referring now to the drawing, in which like numerals refer to identical parts, we have shown a portion of a commutator assembly for a rotor comprising a plurality of commutator segments 10 and armature conductors or leads 11. The electrical connection between the individual segment 10 and the appropriate armature winding lead 11 is effected by relatively long conductor strips or risers 13 which are secured to the commutator segment 10 by soldering, brazing or welding and are secured to the lead 11 in a similar manner. In many of the larger dynamoelectric machines, these risers may be more than ten inches long.

The relatively long sections of the risers 13 between the commutator segment and the leads 11, if unsupported during operation of the rotor, would vibrate sufficiently at harmonic frequencies to damage the end connections thereof and the insulation thereon. In order to prevent such harmonic vibrations and support the risers 13 against vibration or relative displacement, we have provided an insulating support spacer 18 (Fig. 2), a plurality (Fig. 3) of which may be secured to the risers 13 to form an annular spacing support at one or more points intermediate to the ends of the risers 13. The mass of the annular support and the risers secured thereby change the base harmonic frequency of vibration of the assembly to a value different from the electrical and torsional vibrations encountered in use.

Figure 2:
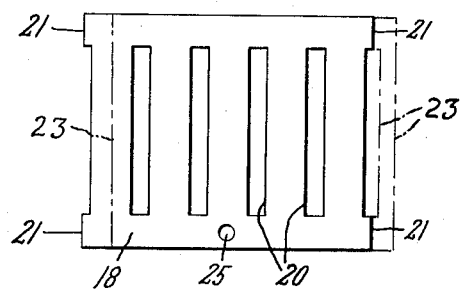
Fig. 2 is a top plan view of the insulating spacers of which our annular supporting structure may be constructed.

As shown in Fig. 2, each of the insulating spacers 18 defines a plurality of apertures 20 which will engage tightly each of the uninsulated risers 13 to prevent any large magnitude of relative movement. We prefer to use an insulating plastic material such as Textolite (Reg. T.M.) or impregnated glass laminate for the support spacer 18 which is of sufficient stiffness to form a solid annular construction when completely assembled as shown in Fig. 3.

In one application, the risers are ¾" by ¹⁄₁₆" in cross-section, and one spacer 18 (1⅛" by 1¼" by ⅛") is positioned to support five risers 13. Each aperture 20 is of a size and shape which will contact all sides of the riser to space and to support positively each riser engaged thereby. In some applications, it may be desirable to provide detents 21 to restrict further any movement of any of the risers 13 between two adjacent spacers 18. Another construction which would provide support of each riser 13 would be to terminate the spacer midway between the apertures 20 as indicated by the phantom lines 23. However, in many constructions, the only vibration or movement of the risers 13 which requires additional stiffness is in the tangential direction of the commutator assembly so that the detents 21 may be omitted and the construction shown by the phantom lines 23 is not requisite.

Figure 3:
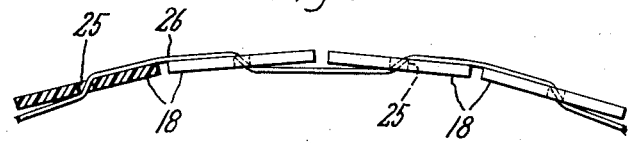
Fig. 3 is a view of a plurality of the assembled supporting spacers.

One additional means of binding the spacers 18 in a solid annular ring may be provided by use of an aperture 25 through which a binding cord 26 may be threaded as shown in Fig. 3. As is known in the art, this binding cord 26 may be impregnated with a thermo-setting resin so that when the armature is completed, the cord 26 will be rigid to prevent relative movement of the spacers 18.

Figure 5:
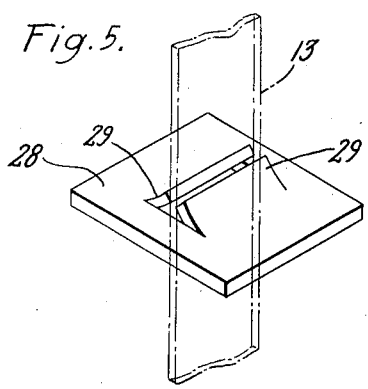
Fig. 5 is a perspective view of the holding device shown in Fig. 4.
Figure 4:
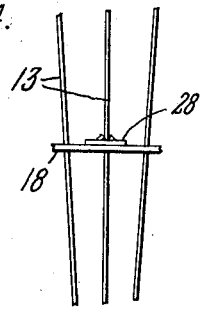
Fig. 4 is a side elevation of a modification of our invention.

In Fig. 4, we have shown a modified holding means in the form of a lock-clip 28 which may be made of spring steel and will prevent the spacers 18 from being displaced radially by centrifugal forces during rotation of the assembly. This lock-clip, as shown in perspective in Fig. 5, is provided with flaps 29 which are deflected upwardly when assembled as shown to engage tightly the sides of the riser 13 (in phantom) and thus provide permanent type positioning means.

However, in many applications, the tightness of the completed annular spacer support will provide sufficient arch binding between the ends of the spacers 18 and the interposed risers 13 to prevent radial displacement during operation. It should be noted that with our invention it is feasible to drive the individual spacers downward with sufficient force to provide substantial arch binding. Obviously, the providing of a spacer having apertures with both ends of the material between the risers being supported, it is possible to exert radial forces on the edges of the spacer 18 to drive the spacers toward the riser and obtain a binding fit without causing breakage of the material between the risers.

In a completed machine embodying this simplified construction, additional support for preventing radial displacement will be provided by some type of glue. In this respect, the surface tension at the corner defined by the spacer 18 and the riser 13 will produce a fillet-like accumulation of insulating resinous material 30 such as is normally applied to complete the insulation system of the risers 13.

In order to obtain a proper support, we prefer to have the aperture 20 of the spacer 18 fit tightly enough around the periphery of the risers 13 to provide some additional frictional resistance to movement. Thus, once the risers are coated with insulated resinous material, all of the resinous length of the riser will inhibit radial movement of each spacer 18. Moreover, since the spacing of the risers increases with their radial displacement, any stiffness of the riser 13 will inhibit displacement of the spacer 18. This rigidity is substantially increased upon completion of the rotor by the securing of the radial outer extremities of the risers 13 to the rotor winding leads 11.

While we have illustrated and described particular embodiments of our invention, other modifications will occur to those skilled in the art. We desire it to be understood, therefore, that our invention is not to be limited to the particular arrangement disclosed, and we intend in the appended claims to cover all such modifications as fall within the true spirit and scope of our invention.

What we claim as new and desire to secure by Letters Patent of the United States is:

1. In a dynamoelectric machine rotor having a segmented commutator and armature leads with a plurality of relatively long risers interconnecting selectively commutator segments to the leads for forming the electrical circuit of the rotor wherein the risers are subject to harmonic vibration considerations, a spacing arrangement for the risers to inhibit independent vibration and relative movement thereof comprising, a plurality of stiff insulating spacers each defining a plurality of apertures within which the risers are positioned whereby independent movement of the confined risers is prevented, the spacers being positioned equidistant from the commutator segments and adjacent tangentially for cooperating with the risers confined and each other to provide a rigid annular support thereby preventing relative tangential movement of the supported portion of the risers, and the spacers being restricted from radial movement at least partially by accumulated tangential arch binding resulting from the reduced perimeter of the annular support obtainable by forcing each of the spacers toward the commutator segments.

2. In a dynamoelectric machine rotor having a segmented commutator and armature leads with a plurality of relatively long risers selectively interconnecting commutator segments to the leads for forming the electrical circuit of the rotor, a spacing arrangement for the risers to inhibit independent vibration and relative movement thereof comprising, a plurality of stiff insulating spacers each defining a plurality of spaced completely enclosed apertures within which the risers are positioned whereby independent movement of the confined risers is thereby restricted, the apertures being of a size substantially equal to the cross-sectional area of the risers confined, the spacers being positioned equidistant from the commutator segments and adjacent tangentially to each other for cooperating with the risers confined and each other to provide a rigid annular support thereby preventing relative tangential movement of the supported portion of the risers, the spacers being restricted from radial movement at least partially by accumulated tangential arch binding resulting from the reduced perimeter of the annular support obtainable by forcing each of the spacers toward the commutator segments, and a hard resinous composition covering the risers adjacent to the annular support whereby with the size apertures defined by the spacers, radial movement of the spacers may not be accomplished without rupturing the resinous covering.

3. In a dynamoelectric machine rotor having a segmented commutator and armature leads with a plurality of relatively long risers interconnecting selectively commutator segments to the leads for forming the electrical circuit of the rotor, a spacing arrangement for the risers to inhibit independent vibration and relative movement thereof comprising, a plurality of stiff insulating spacers each defining a plurality of spaced apertures within which the risers are positioned whereby independent movement of the confined risers is thereby restricted, the apertures being of a size substantially equal to the cross-sectional area of the risers confined, the spacers being positioned equidistant from the commutator segments and adjacent tangentially to each other for cooperating with the risers confined and each other to provide a rigid annular support thereby preventing relative tangential movement of the supported portion of the risers, the spacers movement being restricted by accumulated tangential arch binding resulting from the reduced perimeter of the annular support obtainable by forcing each of the spacers toward the commutator segments, and a holding means connected to the annular support to inhibit radial movement of the spacers.

References Cited in the file of this patent

UNITED STATES PATENTS

| | | |
|---|---|---|
| 903,829 | Behrend | Nov. 17, 1908 |
| 1,005,874 | Ralston | Oct. 17, 1911 |
| 2,829,289 | Ottewell | Apr. 1, 1958 |